United States Patent

Salahshourian

[15] 3,644,662
[45] Feb. 22, 1972

[54] STRESS CASCADE-GRADED CABLE TERMINATION

[72] Inventor: Hooshang Salahshourian, Fairfield, Conn.
[73] Assignee: General Electric Company
[22] Filed: Jan. 11, 1971
[21] Appl. No.: 105,198

[52] U.S. Cl. ..............................174/73 R, 174/127, 324/54
[51] Int. Cl. ....................................H02g 15/02, G01r 31/12
[58] Field of Search ............174/73 R, 73 SC, 127; 310/196; 324/54

[56] References Cited

UNITED STATES PATENTS

| | | | |
|---|---|---|---|
| 1,667,743 | 5/1928 | Sievert et al. | 174/73 R |
| 1,868,962 | 7/1932 | Atkinson | 174/73 R |
| 3,210,460 | 10/1965 | Suelmann | 174/73 R |
| 3,349,164 | 10/1967 | Wyatt | 174/73 R |
| 3,396,231 | 8/1968 | Anderson | 174/73 R |
| 3,582,534 | 6/1971 | Anderson | 174/73 R |

FOREIGN PATENTS OR APPLICATIONS 1,160,938  1/1964  Germany..........................174/73 SC Primary Examiner—Laramie E. Askin
Attorney—R. Jonathan Peters, David M. Schiller, Frank L. Neuhauser, Oscar B. Waddell and Joseph B. Forman

[57] ABSTRACT

Electric cable terminating means for substantially inhibiting ionization at the termini in which semiconductive coatings each having a nonlinear current characteristic are applied in a cascade arrangement, relative to resistance per square, onto the insulation layer for a predetermined length between the high-voltage output end and to the ground shielding means. Each semiconductive coating has a predetermined resistance per square different in value from an adjacent coating, or coatings, and cascaded progressively upward in value from the ground shielding means so that the semiconductive coating adjacent the shielding means has the lowermost value. A conductive coating is applied at opposite ends of the cascade onto the insulation layer to and in contact with the high-voltage output end and in contact with the ground shielding means to establish electrical contact. The cascaded semiconductive coatings have sufficient resistivity so that upon application of voltage the electrical stress at the surface for said length does not exceed the ionization start level of the cable.

10 Claims, 3 Drawing Figures 3,644,662

Inventor
Hooshang Salahshourian

By R. [signature]
Attorney

STRESS CASCADE-GRADED CABLE TERMINATION

This invention relates to cable terminating means. In its more specific aspect, this invention relates to a method for substantially eliminating or inhibiting ionization at the terminus of a cable.

In a typical high voltage cable, a semiconducting layer or tape is applied around the metal conductor, and an insulation layer is extruded over this surface. A ground-shielding means is then concentrically disposed over the insulation, which usually comprises a semiconducting layer and a metallic return shield. The semiconducting layer, for example, may be a nylon tape impregnated with carbon black, or may be polyethylene or butyl rubber having incorporated therein carbon black and extruded over the conductor. The metallic return shield for returning current may be copper, or tinned copper, wrapped around the semiconducting layer or may be a copper braid concentrically disposed over said semiconducting layer. The structure may be further enclosed by a jacketing material such as a polyvinyl chloride layer or a metallic jacket. In the cable construction, it is important to eliminate or minimize any voids, such as in the insulation or at the interfaces, which potentially are a source of breakdown. That is, under high voltage conditions encountered, the voids may ionize thereby leading to the eventual breakdown of the cable.

Cable with a rated voltage of 15,000 volts and higher is tested for voltage breakdown by a high-voltage time test to determine the capability of the insulation. According to the conventional test established by the Association of Edison Illuminating Companies, and which is used in the cable industry, a sample not less than 30 feet in length is cut from the cable. A stress cone is hand wrapped at each terminal. Quite obviously, it takes considerable time and skill to construct the cone so that there are no gaps between the tape layers of the stress cone and between the ground shielding means and the insulation. A tank containing oil is provided with a bottom extension filled with mercury and is insulated from ground. The termini are inserted into the tank and mercury, and the return shield is connected to ground. Voltage is applied from a suitable source through the mercury cup to the cable, and held there for designated time periods. In the 1 hour step test, voltage equal to 150 volts per mil average stress is applied and held for a period of 6 hours unless failure occurs. If there is no failure in the cable, the voltage is increased and held for 1 hour at voltages equal to 180, 215, 260, 285, 315 and 345 volts per mil. If failure does not occur at the maximum stress value, the cable is then considered acceptable.

One distinct disadvantage with the prior art test method is that the semiconducting layer of the stress cone is attacked or dissolved by the oil thereby releasing the carbon black, or other conductive component. Consequently, the contaminated oil conducts current which will cause arcing or flash over and thereby burn out the termination.

It is the purpose of the present invention, therefore, to provide an electric cable terminating means substantially eliminating or inhibiting ionization at the terminus which overcome the disadvantages of the prior art.

The invention, together with its objects and advantages, will best be understood by referring to the following detailed specification, and to the accompanying drawings, in which.

Figure 1:
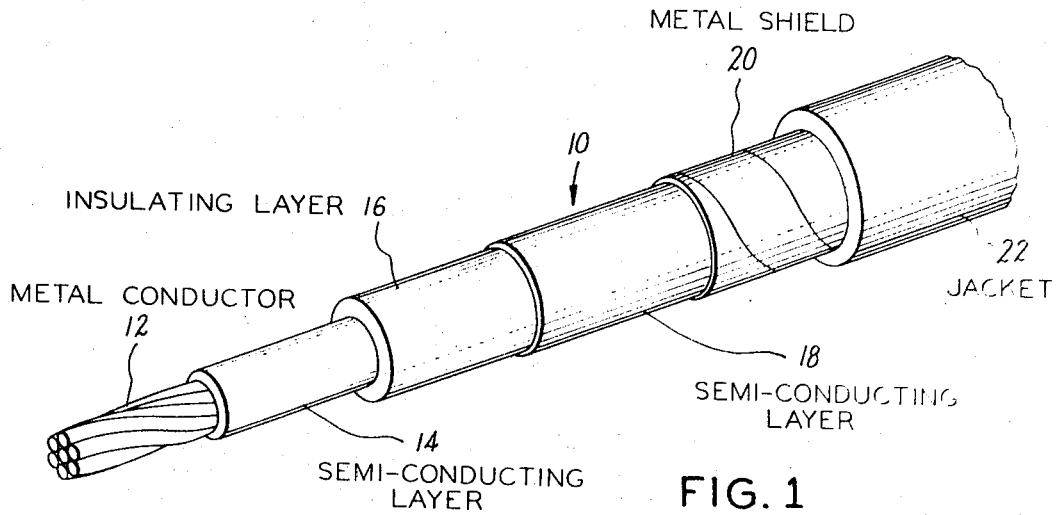
FIG. 1 is a perspective view of a cable of typical construction with portions thereof cut away for the purpose of better illustrating its construction.

In a broad aspect of the invention, I provide cable-terminating means characterized by substantially no ionization by applying in a cascade arrangement semiconductive coatings each having a nonlinear current characteristic onto the insulation layer of the cable between the high voltage output end at the terminus (i.e., conductor) and the ground-shielding means. The coatings extend over the insulation of the cable for a predetermined distance or length, sometimes referred to herein as the termination length, and explained hereinbelow in greater detail. Each semiconductive coating has a predetermined resistance per square different in value from another and from an adjacent coating, or coatings, and cascaded progressively upward in value from the shielding means so that the semiconductive coating adjacent the shielding means has the lowermost value. A conductive coating is applied at opposite ends of the cascade onto the insulation layer to and in contact with the high-voltage output end and to and in contact with the ground-shielding means. In this manner, electrical contact is established between the high-voltage output end and the ground-shielding means, for if otherwise, corona discharge could occur thereby giving a false reading of voltage breakdown. Upon the application of voltage, a voltage drop is established along the coated portion of the termination from the ground-shielding means to the high-voltage output end thereby substantially eliminating ionization in the cable termination.

Referring to the drawings wherein like reference numerals designate similar parts throughout, there is shown a coaxial cable of typical construction indicated generally by the numeral 10, such as might be adaptable for carrying a voltage load of 15 kilovolts, or higher. The cable includes an inner metallic conductor 12 illustrated in the form of a stranded cable, which may be a compact strand, although it should be understood that the conductor 12 may comprise a solid conductor. Generally, a semiconducting layer 14 is applied around the metal stranded conductor for the purpose of establishing a good electrical contact between the conductor and the insulation and further to shield out stresses thereby equalizing all stresses of the individual strands. The metal conductor, with a semiconducting layer applied thereon, is surrounded by a relatively thick insulating layer 16 which is usually applied by extrusion. The insulating material is typically a thermosetting plastic such as cross-linked polyethylene or ethylene-propylene rubber, which may be filled with mineral clay or other suitable fillers. Also, the cable includes a ground shielding means comprising a semiconducting layer or tape 18 and a metallic return shield 20, and, overlying this, the outer jacket 22 is made of conventional material such as polyvinyl chloride.

Figure 2:
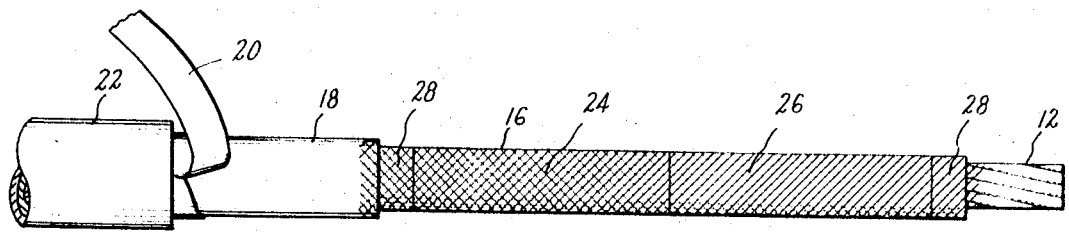
FIG. 2 is a side elevational view of a cable showing a terminating means falling within the scope of this invention.
Figure 3:
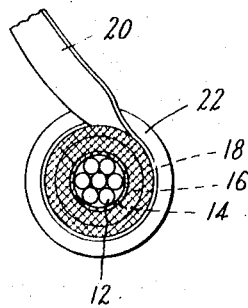
FIG. 3 is a front elevational view of the cable of FIG. 2.

FIG. 2 shows a terminating means prepared in accordance with the invention for a high-voltage time test. Outer jacket 22 is first stripped from the cable termination for a certain distance. The amount stripped will depend upon the termination length required, as explained hereinbelow, but there is no need to strip from the cable more than an inch or two of the jacket beyond the termination length. The copper shield or tape 20 is then unwound slightly more than the full distance of the termination length to expose the semiconducting layer, and, for testing, the end of the tape is connected to ground. Next, the semiconducting layer is removed substantially the full termination length leaving exposed insulation layer 16. A small portion of the end of insulation layer 16 is removed to leave exposed conductor 12 which thereby extends beyond the marginal edge of the insulation layer, and the semiconducting layer 14 is stripped from the exposed end of the conductor.

The termination length is then cleaned of dirt, grease, oil or other contaminants as by washing the termination with Vythene, carbon tetrachloride or other suitable solvent. After the solvent has dried, two or more semiconductive coatings, each having a different resistance per square, and described in greater detail hereinafter, are applied in a cascade arrangement without interruption along the termination length. The drawing illustrates two coatings 24 and 26 and the cascaded coatings extend between the ground shielding means along the insulation layer 16 for a predetermined length and the high-voltage output end (i.e., conductor), but contact therewith is not necessary. Each coating is applied over the circumference of the insulating layer 16 for approximately one-half the termination length, and where desired coating 24 may extend over the circumference of the semiconducting layer 18. The coatings may be applied by painting with a brush, spraying or any other suitable means, and are then permitted to dry as in air.

Coating 24 has the lowermost resistance per square and extends from the ground-shielding means for approximately one-half the termination length. The resistance per square for each coating progresses upwardly from the shielding means so that coating 26 has a resistance per square greater than coating 24. The difference in resistance per square between the coatings is chosen so that the voltage drop in the cascaded sections complement each other to provide the required voltage division for the termination. If the voltage drop between adjacent coatings is not sufficient, then the remaining coating (or coatings) must assume the difference in voltage drop and therefore may become over stressed which will cause over heating and failure. It should be understood, however, that the invention is not limited to the application of two coatings to the termination length, but rather the number of coatings depends upon such factors as the resistance per square values of the coatings employed, the voltage rating of the cable and the geometry of the cable.

Each semiconductive coating is characterized by a resistance per square having nonlinear current properties. Coating compositions comprising particulated nonlinear silicon carbide and boron carbide dispersed in a carrier or vehicle are especially suitable, but other coating compositions such as metal oxides, e.g., iron oxide, may also be used. The chemically pure semiconductive coating compositions are insulators and therefore can not be used without additives which render the compositions semiconductive. Commercial grades of silicon carbide, boron carbide and the like, contain small amounts of impurities such as aluminum or carbon and therefore possess the desired semiconductive properties. Where desired, a small amount of a conductive material such as silver, copper, aluminum or the like, may be added to the semiconductive coating composition in order to adjust the resistivity. The useful range for the resistance value of the coatings may vary depending primarily on the number of different coatings used, cable configuration, voltage and thermal conductivity of the insulation. In determining this range, cable configuration factors include the diameter and/or circumference of the metal conductor, the relation of the diameter across the insulation layer to the diameter of the metal conductor, and the mass of the insulation layer and metal conductor. The thermal conductivity of the insulation layer is significant in that the more conductivity the insulation, the more heat will be absorbed by the conductor, which acts as a heat sink, and consequently the coating adjacent the ground shielding means may have a relatively low resistance value. According to the high voltage one hour step test which requires a maximum stress of 345 volts per mil, the resistivities for the semiconductive coatings should be selected to provide a stress along the termination length of three to five volts per mil. If a stress value much lower than three is used, the termination length would be unwieldy; whereas a value much in excess of five would cause flash over. In the preferred embodiment employing three coatings, the highest resistivity for a coating in the cascade is about $10^8$ to $10^9$ ohms per square, while the coating with the lowest resistivity is about $10^4$ to $10^5$ ohms per square, and the middle coating should have resistivity of intermediate value. A 35-kilovolt cable, for example, with a 4/0 conductor, having a circumference around the insulation of about 3.4 inches, and employing a 24-inch termination length cascaded in three sections of equal length, might have a coating adjacent the ground-shielding means with a resistance of as low as about $10^4$ ohms per square, an intermediate coating with a resistance of about $10^6$ ohms per square and a coating adjacent the conductor with a resistance of about $10^8$ ohms per square at a voltage gradient of 1 kilovolt per inch. If the resistance per square for any of the cascaded sections is too low for the cable, excess heating occurs causing a flashover. On the other hand, if the resistance per square for any of the cascaded sections is too high, the coating will not conduct the current applied.

The silicon carbide, or other nonlinear material, is dispersed in a suitable carrier or vehicle which is relatively fast drying in air. Typical carriers include, for example, modified phenolic varnishes or epoxy-modified varnishes. The varnish is desirably thinned with an organic solvent such as methyl ethyl ketone, toluene or the like.

A conductive coating 28 is applied at opposite ends of the cascade over the circumference of the insulating layer 16 and the semiconducting layer 18 at the one end and the conductor at the other end. The conductive coating should be of sufficient length to assure electrical contact, and desirably this is about 1 inch. In this manner, the electrical connection is established between the semiconductive coatings 24 and 26 and the ground shielding means 18 at one end and the semiconductive coatings and the conductor 12 at the other end. If the electrical contact is not established, corona discharge will occur. Any coating of sufficient conductivity may be used, and includes, for example, copper paint, silver paint, aluminum paint and the like. The coating comprises particulated metal dispersed in a suitable thinner or carrier. A suitable copper coating comprises 3 parts of copper particles in a lacquer thinner such as methyl ethyl ketone, methyl isobutyl ketone or acetone and has a resistivity of 6 ohms per square at a thickness of 1 mil, at 2 mils of 1.5 ohms per square, and at 3 mils of 1 ohm per square.

In conducting the high-voltage time test, metallic shield 20 is connected to ground, and a cable lug, which is ionization free, is connected to the metal conductor at each terminus. At least one cable lug is connected electrically to the test equipment. Each cable, depending upon its class and size, must pass established standards with regards to voltage breakdown. In the conventional test procedure, voltage is applied to a cable to a potential of 150 volts per mil as required by the standard and held there for 6 hours. If there is no failure, a higher potential is applied at 1-hour intervals up to the maximum test level for the cable tested. If the cable does not fail, it is then passed as acceptable.

In accordance with the invention, ionization or corona discharge is substantially precluded by grading the electrical stress sufficiently to maintain the stress along the termination length below the ionization start level of the cable. The electrical stress may be calculated from (1) the voltage load for which the cable is constructed to carry, (2) the circumference of the insulation, (3) termination length, and (4) the resistance per square of the coatings. In calculating the electrical stress, the load bearing characteristic and circumference of the insulation are set by the cable undergoing testing. The invention is applicable to cable adaptable to carry a voltage of 15,000 volts and above, e.g., 35,000 volts. The circumference may vary depending on such factors as the type of insulation used, conductor size, and the like, and generally may have an insulation circumference ranging from about 1 to 10 inches.

The termination length may vary depending largely upon the cable size and voltage-load-bearing characteristic. The heat generated is proportional to the square of the current, and therefore a small increase in current can result in high heat losses. If the termination becomes too hot, arcing will occur between the metal conductor and metal shield which will short out the test equipment, i.e., high potential transformer. On the other hand, if the termination is too short, arcing will occur through air between the conductor and metal shield. For conventional high-power cables, such as cable adaptable for carrying high-voltage loads of about 35 kilovolts, the termination length typically is about 24 inches. The termination length may be more or less depending on such factors as voltage load and circumference around the insulation, and may be determined experimentally by one skilled in the art for each production specification of cable.

To further illustrate the invention, a section of a 35-kilovolt cable core having a 4/0 tinned copper conductor was tested in accordance with the high voltage one hour step test. The cable construction included a semiconducting layer and an insulation layer comprising mineral filled cross-linked polyethylene which had a wall thickness of 270 mils. Both terminations were coated in two 12-inch sections with semiconductive coatings. The coating to the side of the conductor comprised 30 grams of silicon carbide having a girt size of 400 dispersed in 50 grams of vinyl modified phenolic varnish sold by General Electric Company under the trade designation 7,031 and 25 grams of thinner comprising equal parts by volume of methyl ethyl ketone, butyl cellosolve and toluene. This same composition was used for the second semiconductive coating except that a small quantity of silver powder was incorporated therein to lower the resistivity. Copper paint was applied to opposite ends of the cascade so as to be in electrical contact with one semiconductive coating and conductor at one end and the other semiconductive coating and shielding means at the other end. Voltage was applied to the conductor at a voltage stress of 150 volts per mil for 6 hours, and then stepped up at 1-hour intervals to 345 volts per mil. There was no failure in the cable, and the voltage was increased to 363 volts per mil at which point the cable failed. This showed that cable can be tested at high-voltage levels without ionization occurring in the terminations.

What I claim as new and desire to secure by Letters Patent of the United States is:

1. Electric cable terminating means for substantially inhibiting ionization at the termini of said cable comprising an insulation layer surrounding a conductor and a ground shielding means concentrically disposed over said insulation layer, said cable having a voltage rating of not less than about 15,000 volts, the improvement which comprises: a plurality of semiconductive coatings applied in a cascade arrangement onto said insulation layer extending for a predetermined length at each terminus between said shielding means and said high voltage output end, said semiconductive coatings having a substantially nonlinear current characteristic upon application of voltage, each of said semiconductive coatings having a predetermined resistance per square different in value from an adjacent semiconductive coating and cascaded progressively upward in value from said shielding means so that the coating adjacent said shielding means has the lowermost value, a conductive coating applied at opposite ends of said cascade arrangement onto said insulation layer to and in contact with said shielding means and said high-voltage output end to establish electrical contact, the resulting cascaded coatings having sufficient resistivity such that upon the application of voltage the electrical stress at the surface for said length does not exceed the ionization level of the cable.

2. Electric cable according to claim 1 wherein the semiconductive coatings provide a stress along the termination length of 3 to 5 volts per mil.

3. Electric cable according to claim 1 wherein the semiconductive coating of highest resistivity has a resistance of about $10^8$ to $10^9$ ohms per square.

4. Electric cable according to claim 1 wherein said termination length is cascaded in two sections each of about equal length and the semiconductive coating of highest resistivity comprises particulated silicon carbide and has a resistance of about $10^8$ to $10^9$ ohms per square.

5. Electric cable according to claim 1 wherein said termination length is cascaded in three sections of about equal length and the semiconductive coatings have a resistance per square of about $10^8$ ohms, $10^6$ ohms and $10^4$ ohms per square.

6. A method for testing cable by high-voltage time test, said cable comprising an insulation layer surrounding a conductor and a ground shielding means concentrically disposed over said insulation layer and having a voltage rating of not less than about 15,000 volts, which comprises: applying a plurality of semiconductive coatings in a cascade arrangement onto said insulation layer for a predetermined length at each terminus between said shielding means and said high-voltage output end, said semiconductive coatings having a substantially nonlinear current characteristic upon application of voltage, each of said semiconductive coatings having a predetermined resistance per square different in value from an adjacent semiconductive coating and cascaded progressively upward in value from said shielding means so that the coating adjacent said shielding means has the lowermost value, applying a conductive coating at opposite ends of said cascade arrangement onto said insulation layer to and in contact with said shielding means and said high-voltage output end to establish electrical contact, the resulting cascaded coatings having sufficient resistivity such that upon the application of voltage the electrical stress at the surface for said length does not exceed the ionization level of the cable, and subsequently applying voltage to said cable to test for failure in the cable.

7. A method according to claim 6 wherein the semiconductive coatings provide a stress along the termination length of 3 to 5 volts per mil.

8. A method according to claim 6 wherein the semiconductive coating of highest resistivity has a resistance of about $10^8$ to $10^9$ ohms per square.

9. A method according to claim 6 wherein said termination length is cascaded in two sections each of about equal length and the semiconductive coating of highest resistivity comprises particulated silicon carbide and has a resistance of about $10^8$ to $10^9$ ohms per square.

10. A method according to claim 6 wherein said termination length is cascaded in three sections of about equal length and the semiconductive coatings have a resistance per square of about $10^8$ ohms, $10^6$ ohms and $10^4$ ohms per square.

* * * * *